(12) United States Patent
Reilly et al.

(10) Patent No.: US 6,996,510 B1
(45) Date of Patent: Feb. 7, 2006

(54) SYSTEM AND METHOD FOR MODELING COMMUNICATION NETWORKS

(75) Inventors: John P. Reilly, Plano, TX (US); David C. Campbell, Allen, TX (US)

(73) Assignee: Metasolv Software, Inc., Plano, TX (US)

( * ) Notice: Subject to any disclaimer, the term of this patent is extended or adjusted under 35 U.S.C. 154(b) by 790 days.

(21) Appl. No.: 09/766,422

(22) Filed: Jan. 18, 2001

Related U.S. Application Data (60) Provisional application No. 60/177,556, filed on Jan. 21, 2000.

(51) Int. Cl.
*G06F 17/50* (2006.01)
*G06F 15/173* (2006.01)

(52) U.S. Cl. .................. 703/13; 709/221; 709/224; 709/226; 370/254

(58) Field of Classification Search ........ 709/220–224, 709/226; 345/734, 735, 764; 702/186; 703/21, 4, 13; 370/351, 241, 254; 707/10; 716/12
See application file for complete search history.

(56) References Cited

U.S. PATENT DOCUMENTS

| | | | |
|---|---|---|---|
| 5,276,789 A | 1/1994 | Besaw et al. .............. 395/140 |
| 5,394,522 A | 2/1995 | Sanchez-Frank et al. ... 395/159 |
| 5,671,355 A | 9/1997 | Collins .................... 395/200.2 |
| 5,684,967 A | 11/1997 | McKenna et al. .......... 395/329 |
| 5,687,315 A | 11/1997 | Tezuka et al. ........... 395/200.1 |
| 5,715,432 A * | 2/1998 | Xu et al. .................... 345/764 |
| 5,751,962 A | 5/1998 | Fanshier et al. ....... 395/200.53 |
| 5,754,831 A * | 5/1998 | Berman ....................... 703/13 |
| 5,793,958 A * | 8/1998 | Clement et al. ............ 709/220 |
| 5,793,974 A | 8/1998 | Messinger ............. 395/200.54 |
| 5,809,265 A | 9/1998 | Blair et al. ................. 395/339 |
| 5,809,282 A * | 9/1998 | Cooper et al. .............. 709/226 |
| 5,812,779 A | 9/1998 | Ciscon et al. .......... 395/200.53 |
| 5,821,937 A | 10/1998 | Tonelli et al. .............. 345/356 |
| 5,831,610 A * | 11/1998 | Tonelli et al. .............. 345/735 |
| 5,831,618 A | 11/1998 | Fuji et al. .................... 345/356 |
| 5,838,907 A | 11/1998 | Hansen .................... 395/200.5 |
| 5,889,520 A | 3/1999 | Glaser ....................... 345/349 |
| 5,907,696 A * | 5/1999 | Stilwell et al. ............... 703/13 |
| 5,910,803 A | 6/1999 | Grau et al. ................. 345/357 |
| 5,933,601 A | 8/1999 | Fanshier et al. ....... 395/200.53 |
| 5,958,012 A | 9/1999 | Battat et al. ................ 709/224 |

(Continued)

FOREIGN PATENT DOCUMENTS

WO  WO 92/05485  4/1992

OTHER PUBLICATIONS

Arvidsson et al., A. The Design and Management of ATM Virtual Path Connection Networks, IEEE 7th Int. Symposium on MOdeling, Analysis, and Simulation of Computer and Telecommunication Systems, Oct. 1999, pp. 2-9.*

(Continued)

*Primary Examiner*—Russell Frejd
(74) *Attorney, Agent, or Firm*—Baker Botts L.L.P.

(57) ABSTRACT

In one embodiment, a system for modeling communication networks includes a memory and a processing module. The memory stores configuration data for a plurality of network types. The configuration data associates each network type with components, connections, and rules for connecting the components using the connections. The processing module is coupled to the memory and allows a user to select one of the network types and to design a communication network using the components and connections associated with the selected network type according to the configuration data.

36 Claims, 7 Drawing Sheets

U.S. PATENT DOCUMENTS

| | | | |
|---|---|---|---|
| 5,966,128 A | 10/1999 | Savage et al. | 345/356 |
| 5,974,127 A | 10/1999 | Wernli et al. | 379/201 |
| RE36,444 E | 12/1999 | Sanchez-Frank et al. | 345/349 |
| 6,009,466 A | 12/1999 | Axberg et al. | 709/220 |
| 6,018,769 A | 1/2000 | Tezuka et al. | 709/220 |
| 6,020,889 A | 2/2000 | Tarbox et al. | 345/356 |
| 6,058,260 A * | 5/2000 | Brockel et al. | 703/4 |
| 6,058,262 A * | 5/2000 | Kawas et al. | 703/13 |
| 6,108,309 A * | 8/2000 | Cohoe et al. | 370/241 |
| 6,363,334 B1 * | 3/2002 | Andrews et al. | 703/13 |
| 6,477,572 B1 * | 11/2002 | Elderton et al. | 709/224 |
| 6,643,837 B2 * | 11/2003 | Campbell et al. | 716/12 |
| 6,651,062 B2 * | 11/2003 | Ghannam et al. | 707/10 |

OTHER PUBLICATIONS

E. Vázquez et al., "Graphical Interface for Communication Network Analysis and Simulation" XP 000289613, *6th Mediterranean Electrotechnical Conference,* May 22-24, 1991, 5 pages.

PCT International Search Report in International Application No. PCT/US 01/01899, dated Aug. 8, 2001, 7 pages.

* cited by examiner

| NETWORK TYPE | COMPONENT TYPE | CONNECTION TYPE | RULES |
|---|---|---|---|
| DLC | RDTs COTs | TR-008 GR-303 43801 | MAXIMUM OF 8 RDTs |
| ⋮ | ⋮ | ⋮ | ⋮ |
| VPN | END-USER LOCATION TRANSPORT NETWORK SERVER | ETHERNET IP | MINIMUM OF 1 SERVER |

*FIG. 4A*

| COMPONENT TYPE | LEVEL | PROPERTIES |
|---|---|---|
| LDS | 1 | |
| COTs | 2 | CAN CONNECT TO MAXIMUM OF 5 RDTs CAN CONNECT TO RDT USING T1 |
| ⋮ | ⋮ | ⋮ |
| RDTs | 3 | CAN CONNECT TO COT USING T1 |

*FIG. 4B*

| CONNECTION TYPE | LEVEL | PROPERTIES |
|---|---|---|
| TR-008 | 1 | INCLUDE MAXIMUM OF 4 T1's |
| GR-303 | 1 | 672 PHYSICAL PORTS 1536 VIRTUAL PORTS |
| ⋮ | ⋮ | ⋮ |
| T1 FACILITY CIRCUITS | 2 | INCLUDES 24 POTS SERVICES |

SYSTEM AND METHOD FOR MODELING COMMUNICATION NETWORKS

CROSS REFERENCE TO RELATED APPLICATIONS

This application claims the benefit of Ser. No. 60/177,556, entitled "Network Systems and Network Areas/Serving Areas," filed provisionally on Jan. 21, 2000.

TECHNICAL FIELD OF THE INVENTION

This invention relates generally to the field of communications and, more particularly, to a system and method for modeling communication networks.

BACKGROUND OF THE INVENTION

A communication network generally includes components coupled together by connections. Different types of communication networks includes different types of components, different types of connections, and different rules for connecting the components using the connections. For example in a Digital Loop Carrier network, a Central Office Terminal (COT) may be coupled to a Remote Digital Terminal (RDT) by a T1 facility circuit. In addition, rules may specify the maximum number of RDTs that can be coupled to a COT. Unfortunately, due to differences in components, connections, and rules for different types of networks, software developers have a great degree of difficulty designing and implementing software for modeling different types of communication networks.

SUMMARY OF THE INVENTION

In accordance with the present invention, a system and method for modeling communication networks is provided that substantially eliminates or reduces disadvantages or problems associated with previously developed systems and methods.

In one embodiment, a system for modeling communication networks includes a memory and a processing module. The memory stores configuration data for a plurality of network types. The configuration data associates each network type with components, connections, and rules for connecting the components using the connections. The processing module is coupled to the memory and allows a user to select one of the network types and to design a communication network using the components and connections associated with the selected network type according to the configuration data.

In another embodiment, a system for modeling communication networks includes a memory and a processing module. The memory stores first configuration data for a first network type and second configuration data for a second network type. The processing module, coupled to the memory, determines whether a first mode operation corresponding to the first network type is activated and models a communication network of the first network type using the first configuration data if the first mode of operation is activated. The processing module also determines whether a second mode of operation corresponding to the second network type is activated and models a communication network of the second network type using the second configuration data if the second mode of operation is activated.

The present invention provides a number of important technical advantages. Unlike previous techniques, the present invention models communication networks using a generic modeling module for processing and configuration data for different types of networks. The configuration data associates the different types of networks with components, connections, and rules for connecting the components using the connections. The modeling module includes computer readable instructions for processing the configuration data to model the different types of networks. With a modeling module that can generically model communication networks, software developers can more easily design and implement the capability of modeling new types of networks by interfacing the modeling module with the configuration data for those new types of networks.

Furthermore, by associating different modes of operation with the different types of networks, developers can more effectively deploy their modeling software. A developer may activate modes of operation to enable a user to create specific types of networks or de-activate modes of operation to disable a user from creating other types of networks. For these and other readily apparent reasons, the present invention represents a significant advance over prior art systems and methods.

DETAILED DESCRIPTION OF THE DRAWINGS

Figure 1:
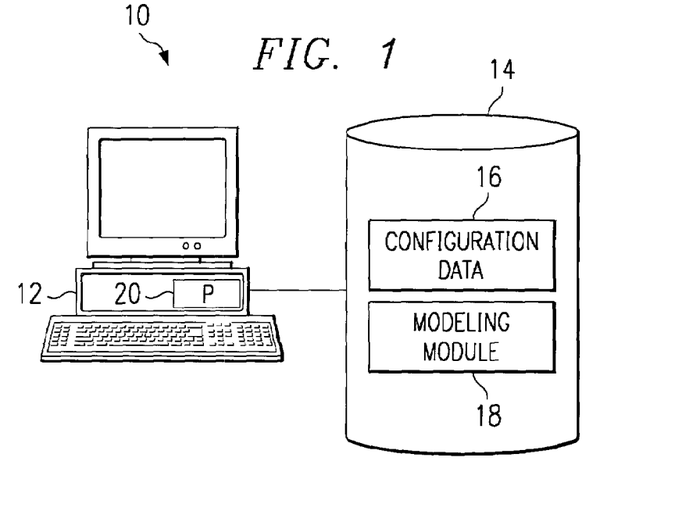
FIG. 1 is a block diagram of a system for modeling communication networks using a generic modeling module and configuration data for different types of communication networks.

FIG. 1 is a block diagram of a system 10 for modeling communication networks using a generic modeling module 18 and configuration data 16 for different types of communication networks. System 10 includes a computer 12 and a memory 14. Memory 14 stores configuration data 16 and modeling module 18. Configuration data 16 associates different types of communication networks with components, connections, and rules for connecting the components using the connections. Modeling module 18 interfaces with configuration data 16 so that a user may model different types of communication network using computer 12. System 10 allows greater flexibility and provides increased efficiencies in developing and using software to model different types of communication networks.

Computer 12 executes modeling module 18 to allow a user to model different types of communication networks. Computer 12 includes a processor 20, an input device 22, and an output device 24. Processor 20 may include any suitable combination of hardware and software components that can execute modeling module 18. Input device 22 may include a keyboard, a mouse, a touch screen, or any other suitable device capable of receiving instructions from a user. Output device 24 may include a computer monitor, a projector, a printer, or any other suitable device with a display screen or other visual output capability. Computer 12 executes modeling module 18 using processor 20 and interacts with users using input device 22 and output device 24. Although computer 12 appears as a personal computer in the particular embodiment of FIG. 1, computer 12 may be a mainframe, workstation, personal digital assistant, or any other suitable processing or communication device. In a shared work environment, separate devices (such as server and client computers) may operate over a local-area, wide-area, or other type of network to perform the operations associated with computer 12.

Memory 14 stores configuration data 16 and modeling module 18. Memory 14 may include any suitable combination of volatile or non-volatile storage located internal to or external from computer 12.

Configuration data 16 includes information associating different types of communication networks with components, connections, and rules for connecting components using the connections. Configuration data 16 may include information for Digital Loop Carrier (DLC), SONET, LAN/WAN, wireless, Hybrid Fiber Coax (HFC), Internet Protocol (IP), Frame Relay, or any other suitable types of communication network. Configuration data 16 governs how each type of network is constructed according to the properties and behavior particular to each type of network. For each type of network, configuration data 16 describes the different types of components and connections that may make up the network and defines how the components can be connected using the connections. For example, in a particular embodiment of configuration data 16 for a DLC-type network, components may include Central Office Terminals (COTs) and Remote Digital Terminals (RDTs), and connections may include TR-008, GR-303, 43801, and T1 facility circuits. In addition to describing these components and connections, configuration data 16 may also associate DLC-type networks with rules specifying that a maximum of five RDTs can be connected to a COT or that a DLC-type network includes a maximum of eight RDTs.

Modeling module 18 includes computer readable instructions for using configuration data 16 to model different types of communication networks. Modeling module 18 models a communication network by creating nodes to represent components and connection lines to represent connections between components. In addition to modeling a communication network, modeling module 18 may identify maintenance channels, manage the capacity of the communication network, assign customer service items to the network, or any other suitable processing associated with the communication network. Rather than create separate modules to handle the processing for different types of communication networks, modeling module 18 is a generic object (or combination of objects) that can perform processing associated with different type of communication network using appropriate information from configuration data 16. As a result, system 10 enables developers to more efficiently design and implement software for modeling communication networks and provides greater flexibility in deploying that software.

In operation, modeling module 18 provides the functionality to design a communication network of any type included in configuration data 16. To create a network, a user selects a network type from the types included in configuration data 16. In addition, modeling module 18 associates a name, description, date, or other attributes with the user's specific instance of the selected type of network. Modeling module 18 may receive attributes, such as a name or description, from the user or attributes, such as network properties, from configuration data 16. Alternatively, modeling module 18 may automatically generate attributes, such as an initial date of creation or a date of last modification.

In a particular embodiment, modeling module 18 includes different modes of operation for each type of network included in configuration data 16, and a user may create a network of a particular type only if the mode of operation associated with that network type is activated. Using this feature, a software developer may activate modes of operation to enable a user to create specific types of communication network or de-activate modes of operation to disable a user from creating other types of communication networks. The different modes of operation may be activated or de-activated by software keys, passwords, or any other suitable means.

To graphically create the network, the user selects and lays out components for the network. Modeling module 18 uses nodes to represent the components. A node may be a single or multiple objects of any suitable shape or size. In a particular embodiment, modeling module 18 uses different nodes to represent different types of components. Modeling module 18 displays the nodes using output device 24, and a user may manipulate the nodes using input device 22. In a particular embodiment, a user can drag and drop nodes to specific locations using a mouse or other suitable input device 22.

Modeling module 18 ensures that the user's actions comply with configuration data 16. In a particular embodiment, modeling module 18 determines what components are valid for the associated network type and makes only those valid component available for user selection. For example, for a DLC-type network, modeling module 18 may allow a user to select and manipulate only Local Digital Switches (LDSs), COTs, RDTs, or other components associated with DLC-type networks according to configuration data 16. In an alternative embodiment, modeling module 18 monitors the user's actions and notifies the user of any invalid actions. For example, modeling module 18 may monitor the user's selection of components and notify the user when the user selects an invalid component that is not associated with the network type according to configuration data 16. Similarly, modeling module 18 may notify the user of any violation of the rules associated with the network type. Using any suitable combination of prohibitions and notifications, modeling module 18 ensures compliance with configuration data 16.

In addition to laying out the components, modeling module 18 may assign each component a name, number, status, network location, or other attributes. Modeling module 18 may receive attributes, such as a name or description, from the user or attributes, such as component properties, from configuration data 16. Alternatively, modeling module 18 may automatically generate and store attributes, such as an initial date of creation or a date of last modification. In a particular embodiment, modeling module 18 ensures that each component is uniquely identified by a single attribute (such as a name) or combination of attributes (such as a name and a number). In a particular embodiment, modeling module 18 assigns a value to a level attribute for each component. The level attribute indicates the number of components between that component and a base component. For example, in a DLC-type network, a LDS is the base or level one component, a COT is a level two component because it may couple directly to the LDS, and a RDT is a level three component because it is coupled to a LDS by a COT.

In a particular embodiment, modeling module 18 also allows a user to associate equipment with the components. For example, a user may associate processing or communication cards with a component. In a particular embodiment, modeling module 18 indicates in its representation of a component whether the component has equipment associated with it.

To further create the network, modeling module 18 also allows a user to select and lay out connections between the components. Modeling module 18 uses connection lines to represent connections between components. A connection line may be a single or multiple objects of any suitable shape or size that indicate a relationship between two or more components. An individual connector line may represent a single connection or one or more groups of connectors. In a particular embodiment, modeling module 18 uses different types of lines to represent different types of connections. Modeling module 18 displays the lines using output device 24, and a user may manipulate the lines using input device 22. In a particular embodiment, a user can drag and drop lines to specific locations using a mouse or other suitable input device 22.

Modeling module 18 ensures that the user's actions comply with configuration data 16. In a particular embodiment, modeling module 18 determines what connections are valid for the associated network type and makes only those valid connections available for user selection. For example, for a DLC-type network, modeling module 18 may allow the user to select and manipulate only TR-008, GR-303, 43801, T1 facility circuits, and other types of connections associated with DLC-type networks according to configuration data 16. In an alternative embodiment, modeling module 18 monitors the user's actions and notifies the user of any invalid actions. For example, modeling module 18 may monitor the user's selection of connections and notify the user when the user selects an invalid component that is not associated with the network type according to configuration data 16. Similarly, modeling module 18 may notify the user of any violation of the rules associated with the network type. For example, modeling module 18 may the user when the maximum number of connections between two components has been exceeded. Using any suitable combination of prohibitions and notifications, modeling module 18 ensures compliance with configuration data 16.

In addition to laying out the connections, modeling module 18 may assign a name, number, status, network location, or other attributes to the connections. Modeling module 18 may receive attributes, such as a name or description, from the user or attributes, such as connection properties, from configuration data 16. Alternatively, modeling module 18 may automatically generate attributes, such as an initial date of creation or a last date of modification. In a particular embodiment, modeling module 18 ensures that each connection is uniquely identified by a single attribute (such as a name) or combination of attributes (such as a name and a number).

Configuration data 16 and modeling module 18 may use hierarchies of connectors to model a connection between components, and a user may create, design, and associate facilities with the connections. Configuration data 16 may associate network types with a hierarchy of connectors and specify the maximum number of subordinate levels for each connection and the maximum number of connectors for each subordinate level. For example, configuration data 16 may associate a DLC-type network with a TR-008, GR-303, 43801, and other types of level one connectors, and each level one connector includes a group of subordinate T1 facility circuits.

In a particular embodiment, modeling module 18 allows a user to select a type of level one connector and then to specify the subordinate connectors for the selected level one connector. For example, in constructing a DLC network, a user may associate T1 facility circuits with TR-008, GR-303, 43801, and other types of level one connectors. Modeling module 18 checks to ensure that the user does not exceed the maximum number of subordinate levels or the maximum number of connectors for each subordinate level. In an alternative embodiment, in response to a user selecting a level one connector, modeling module 18 automatically requires subordinate connectors with the selected level one connector. For example, for a DLC network, configuration data 16 may specify that some T1 facility circuits subordinate to TR-008, GR-303, 43801, and other types of level one connectors are required.

Either during the design of the network or upon completion of the network, modeling module 18 may validate the network to ensure compliance with the rules associated with the network type according to configuration data 16. This validation helps ensure that the network complies with any rules that may not otherwise be considered during construction of the network. Modeling module 18 may check that the user's network includes a minimum number of components and connections between the components. If the network include hierarchies of connectors, modeling module 18 may also check that a minimum number of subordinate connectors is associated with each level-one connector. For example, for a DLC-type network, modeling module 18 may check that a minimum number of facility circuits is associated with each TR-008, GR-303, 43801, and other type of level one connectors. In addition, modeling module 18 may also check that no higher level component is placed into service if a component with a lower level is not in service. For example, in a DLC network, a RDT connected to a COT cannot be placed in service until the COT is in service.

Modeling module 18 may also assist in provisioning the user's network. Computer 12 may be coupled to a local-area, wide-area, or other suitable network. Using data network addresses or other identifiers associated with the components in the user's network, computer 12 communicates messages to the real-world components represented by nodes. By communicating instructions to the real-world components, modeling module 18 may couple physical ports together using a cross-connect, assign virtual ports to physical ports, associate two virtual ports with one another, or automatically perform any other suitable process to completely or partially provision the network.

Figure 2:
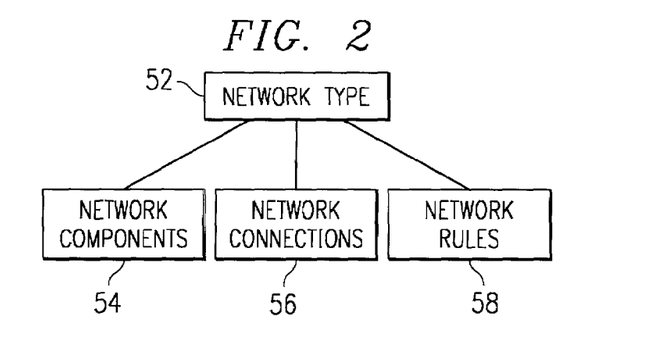
FIG. 2 is block diagram of configuration data.

FIG. 2 is block diagram of configuration data 16. Configuration data 16 associates network types 52 with network components 54, network connections 56, and network rules 58. Network types 52 relate to DLC, SONET, LAN/WAN, wireless, Hybrid Fiber Coax (HFC), IP, Frame Relay, or any other suitable types of communication network. Each instance of network type 52 is associated with a combination of network components 54, network connections 56, and networks rules 58. Network components 54 describes the different types of components in network type 52, and network connections 56 describes the different types of connections in network type 52. Network rules 58 defines how modeling module 18 can connect two components from network components 54 using a connection from network connections 56.

Network type 52, network components 54, network connections 56, and network rules 58 may be stored in memory 14 using tables, arrays, pointers, or any other suitable software techniques. In a particular embodiment, network type 52 is an object including network components 54, network connections 56, and network rules 58, which are themselves separate objects. In an alternative embodiment, network type 52, network components 54, network connections 56, and network rules 58 may be different columns or rows of data stored in a table or database. Although a particular embodiment of configuration data 16 is described with reference to FIG. 2, configuration data 16 may include any information associating different types of communication networks with components, connections, and rules for connecting the components using the connections.

Figure 3:
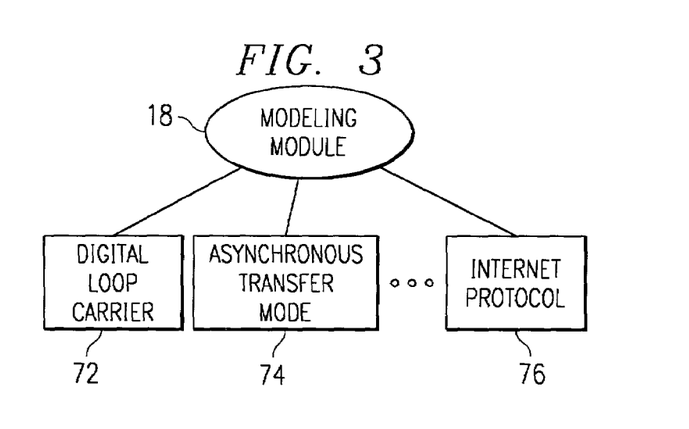
FIG. 3 is a block diagram of a modeling module interfacing with configuration data for different types of communication networks.

FIG. 3 is a block diagram of modeling module 18 interfacing with configuration data 16 for different types of communication networks. As described above, configuration data 16 includes information specific to different types of communication network. In contrast, modeling module 18 is a generic object (or combination of objects) that can perform processing associated with different types of communication network by interfacing with configuration data 16.

In the particular embodiment illustrated in FIG. 3, Digital Loop Carrier (DLC) object 72, asynchronous transfer mode (ATM) object 74, and Internet Protocol (IP) object 76 represent specific examples of configuration data 16. DLC object 72 is configuration data for a DLC-type network, ATM object 74 is configuration data 16 for an ATM-type network, and IP object 76 is configuration data 16 for an IP-type network.

Modeling module 18 is a generic object that can model different types of networks by interfacing with configuration data 16 for the different network types. Modeling module 18 interfaces with DLC object 72 to model a DLC-type network, interfaces with ATM object 74 to model an ATM-type network, and interfaces with IP object 76 to model an IP-type network. After implementing the generic processing for modeling a communication network in modeling module 16, a software developer can more efficiently create software for modeling different types of communication networks by simply generating and storing configuration data 16 for the different types of communication networks.

In a particular embodiment, each object 72, 74, and 76 is associated with a mode of operation, and modeling module 18 interfaces with object 72, 74, and 76 to model a specific type of network only if the associated mode of operation is activated. Using this feature, a software developer may activate modes of operation to enable a user to create specific types of communication network or de-activate modes of operation to disable a user from creating other types of communication networks. The different modes of operation may be activated or de-activated by software keys, passwords, or any other suitable means. By activating and de-activating different types of communication networks, software developers have greater flexibility in deploying their software.

Figure 4A:
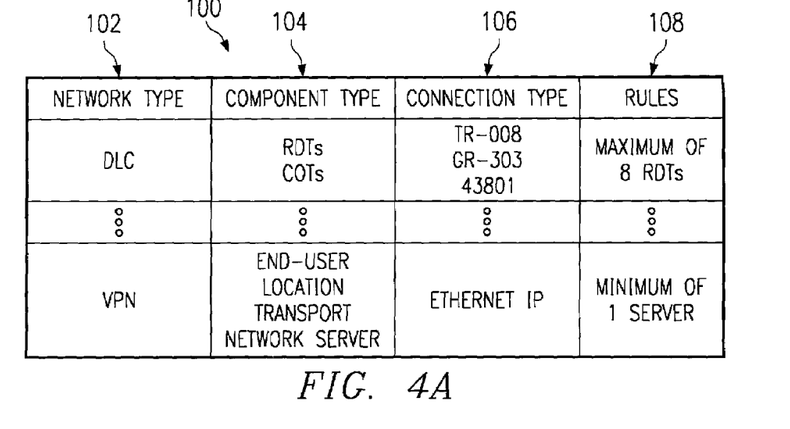
FIGS. 4A, 4B, and 4C are tables of configuration data for different types of communication networks.
Figure 4B:
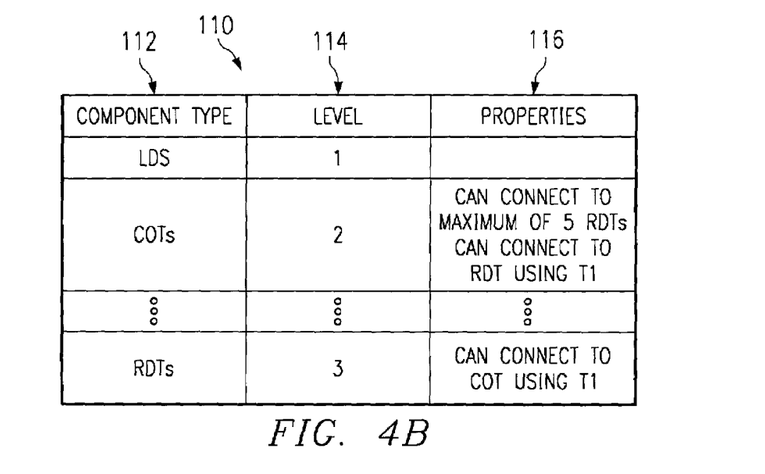
Figure 4C:
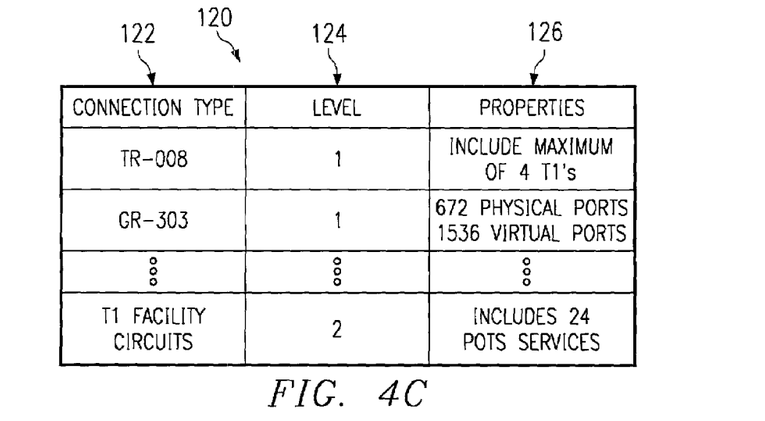

FIGS. 4A, 4B, and 4C are tables of configuration data 16 for different types of communication networks. Although configuration data 16 is depicted and described as a table with reference to FIGS. 4A, 4B, and 4C, memory 14 may store configuration data 16 using tables, arrays, pointers, or any other suitable software techniques.

FIG. 4A illustrates a table 100 associating different types of communication networks with components, connections, and rules for connecting the components using the connections. Column 102 identifies different types of communication networks. Column 102 may include DLC, SONET, LAN/WAN, wireless, Hybrid Fiber Coax (HFC), IP, Frame Relay, or any other suitable types of communication networks. Although the particular embodiment of FIG. 4A uses abbreviations to identify the different types of networks, configuration data 16 may use names, number, or any other suitable information to identify network types.

Columns 104 and 106 associate the network types from column 102 with different types of components and connections, respectively. For illustrative purposes, columns 104 and 106 use names and abbreviations to represent components and connections. In alternative embodiments, column 104 may use names, numbers, pointers to other data structures, or any other suitable information to identify components and connections. Although not illustrated, columns 104 and 106 may include additional properties and other attributes of the connectors and connections. In a particular embodiment, columns 104 and 106 include pointers to other data structures or objects that relate to specific components or connections. For example, column 104 could include pointers to entries of table 110 and column 106 could include pointers to entries of table 120.

Column 108 includes rules for the network types from column 102. For example, the first row of column 108 specifies that a DLC-type network includes a maximum of eight RDTs, and the last row of column 108 specifies that a VPN-type network includes a minimum of one server. In an alternative embodiment, column 108 associates the network types from column 102 with rules for connecting the components of column 104 using the connections of column 106. Although the particular embodiment of table 100 in FIG. 4A includes a single column 108 specifying the rules for the network types of column 102, table 100 may include several columns for the rules. In a particular embodiment, table 100 may include a column specifying the maximum number of each component in column 104 that may be in each network type of column 102 and a separate column specifying the minimum number of each component in column 104 that must be in each network type of column 102.

FIG. 4B illustrates a table 110 describing different types of components. Column 112 identifies the different components. Although the particular embodiment of column 112 in FIG. 4B uses abbreviations to identify the different types of components, column 112 may use names, numbers, or any other suitable information to identify components.

Column 114 associates the components of column 112 with level attributes. Each component's level attribute indicates the number of components between that component and a base component. For example, the illustrated embodiment includes LDSs, COTs, and RDTs, which are components in a DLC-type network. As indicated by column 114, LDS is the base or level one component of a DLC-type network, a COT is a level two component because it may couple directly to a LDS, and a RDT is a level three component because it is coupled to a LDS by a COT. Using level attributes, column 114 identifies a hierarchy of components. Although the particular embodiment of table 110 in FIG. 4B associates components with level attribute, components may not be organized in a hierarchy and may lack level attributes.

Column 116 associates the components of column 112 with specific properties. For example, the second row of column 116 specifies that COTs can connect to a maximum of 5 RDTs and that COTs can connect to RDTs using T1 facility circuits. Although the particular embodiment of table 110 in FIG. 4B includes a single column 116 specifying the properties of components from column 112, table 110 may include several columns for the properties. In a particular embodiment, table 110 may include a column listing the components to which each component of column 112 may be connected and a separate column listing the type of connections that can perform the connecting. In addition, a third column may specify the maximum number of connections to each component of column 112.

FIG. 4C illustrates a table 120 describing different types of connections. Column 122 identifies the different connections. Although the particular embodiment of column 122 in FIG. 4C uses abbreviations to identify the different types of connections, column 122 may use names, number, or any other suitable information to identify connections.

Column 124 associates the connections of column 122 with level attributes. Level attributes are used to describe a hierarchy of connections. For example, the illustrated embodiment includes TR-008, GR-303, and T1 facility circuits, which are connections in a DLC-type network. As indicated by column 124, TR-008 and GR-303 connections are level one connections, and a T1 facility circuit is a level two connections. Level one connections, such as TR-008 and GR-303, are made up of level two connector, such as T1 facility circuits. Using the level attributes of column 124, modeling module 18 can create a hierarchy of connectors between components. Although the particular embodiment of table 120 in FIG. 4C associates connections with level attributes, connections may not be organized in a hierarchy and may lack level attributes.

Column 126 associates the connections of column 122 with specific properties. For example, the first row of column 126 indicates that a TR-008 connection may include a maximum of four T1 facility circuits, and the second row of column 126 specifies that a GR-303 connection has 671 physical ports and 1536 virtual ports to provide concentrated service. Although the particular embodiment of table 120 in FIG. 4C includes a single column 126 for the properties of connections from column 122, table 120 may include several columns for the properties. In a particular embodiment, table 120 includes one column listing the maximum number of subordinate levels for each connection of column 122 and a separate column listing the maximum number of connectors for each subordinate level.

Figure 5A:
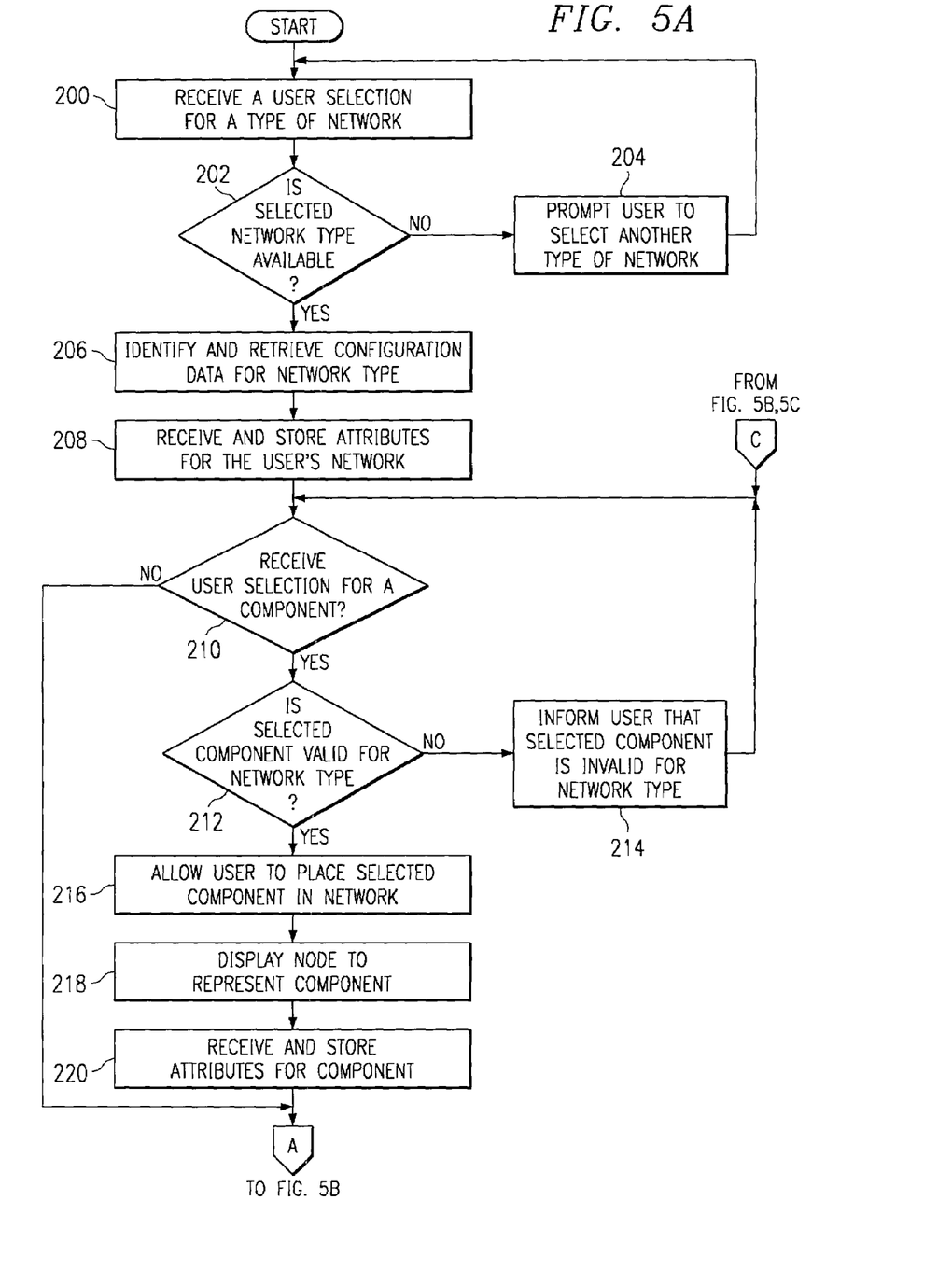
FIGS. 5A–5C are is a flowchart of a method of modeling communication networks using a generic modeling module and configuration data for different types of communication networks, where the modeling module monitors a user's action and notifies the user of any invalid action according to the configuration data.
Figure 5B:
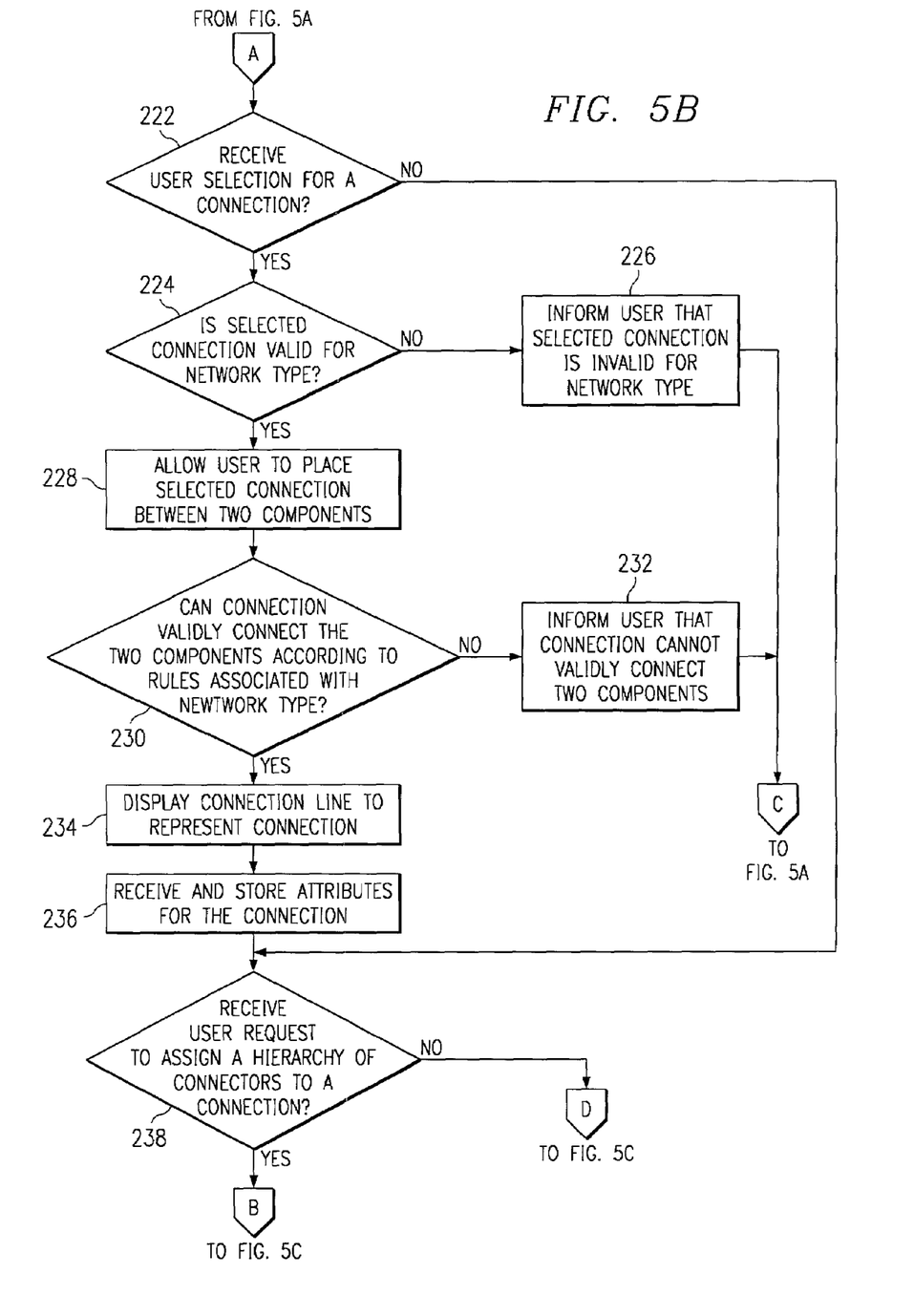
Figure 5C:
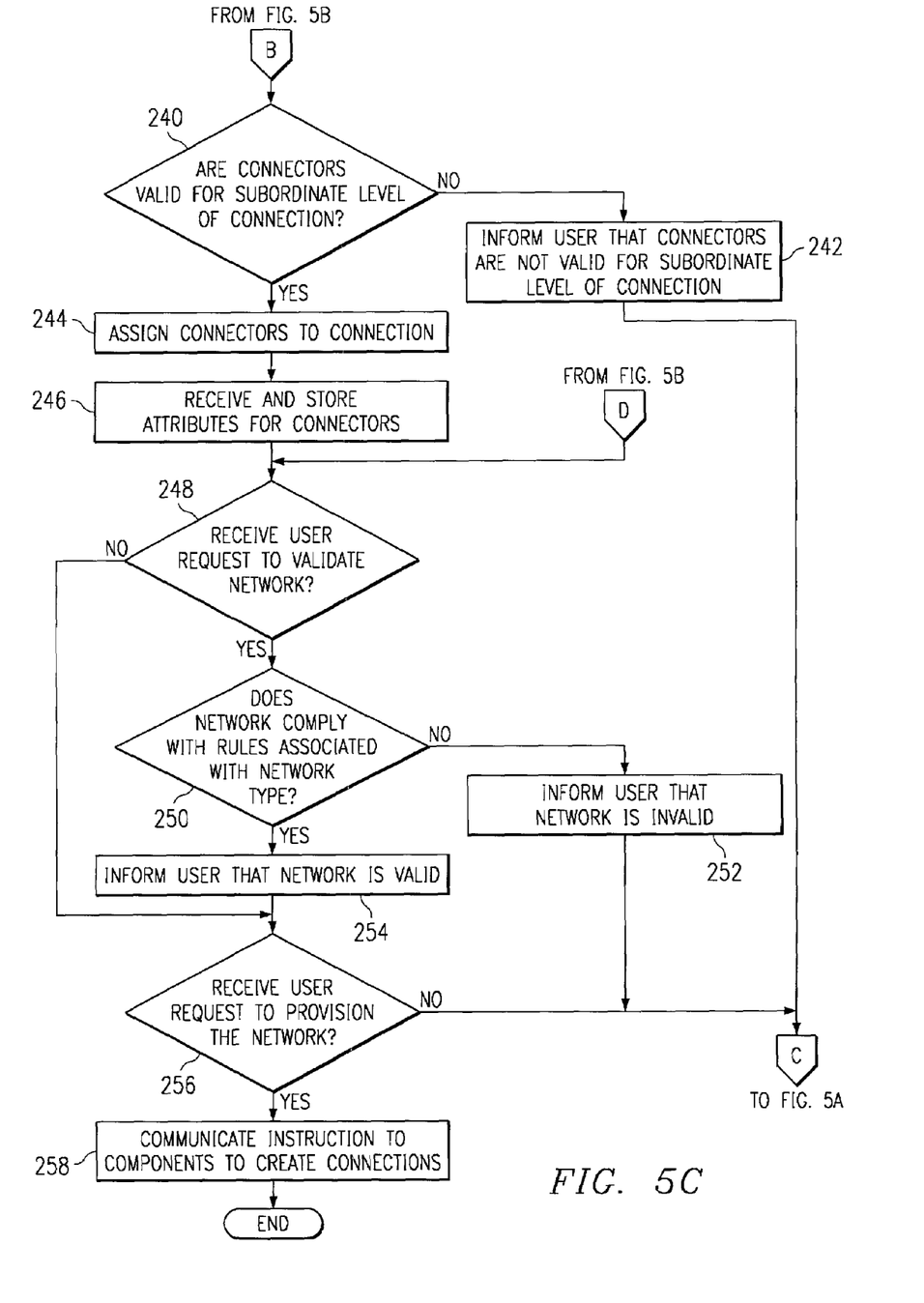

FIGS. 5A–5C are a flowchart of a method of modeling communication networks using modeling module 18 and configuration data 16, where modeling module 18 monitors a user's action and notifies the user of any invalid action according to configuration data 16. The method begins at step 200, where modeling module 18 receives a user selection for a type of communication network. Modeling module 18 checks whether a mode of operation associated with the selected network type is activated at step 202. If the associated mode of operation is not activated, modeling module 18 prompts the user to select another type of network at step 204, and the method return to step 200. If the associated mode of operation is activated, modeling module 18 identifies and retrieves configuration data 16 for the selected network type at step 206. As described above, configuration data 16 describes the components and connections for the selected network type and defines rules for connecting the components using the connections.

At step 208, modeling module 18 receives and stores attributes for the user's network. In a particular embodiment, modeling module 18 receives a name, description, or other attributes from the user or receives network-specific attributes from configuration data 16. In an alternative embodiment, modeling module 18 automatically generates attributes, such as an initial date of creation.

Modeling module 18 allows the user to design and construct the network by following steps 210–258, which may be perform sequentially or in parallel. Modeling module 18 may receive a user selection for a component at step 210, receive a user selection for a connection at step 222, receive a user request to assign a hierarchy of connectors to a connection at step 238, receive a user request to validate the network at step 248, or receive a user request to provision the network at step 256.

At step 210, modeling module 18 may receive a user selection for a component. If modeling module receives a component selection at step 210, modeling module 18 determines whether the selected component is valid for the network type according to configuration data 16 at step 212. This step may involve checking whether the selected component is a component type associated with the network type or whether some other rule associated with the network type has been violated (for example, whether an additional component would exceed the maximum number of components for that network type). If the selected component is not valid for the network type, modeling module 18 informs the user that the selected component is invalid for the network type at step 214, and the method returns to step 210. If the selected component is valid for the network type, modeling module 18 allows the user to place the selected component in the network using input device 22 at step 216 and displays a node to represent the component using output device 24 at step 218. Modeling module 18 receives and stores attributes for the component at step 220. Modeling module 18 may receive attributes, such as a name or description from the user, or receive attributes, such as component properties, from configuration data 16.

At step 222, modeling module 18 may receive a user selection for a connection. If modeling module 18 receive a connection selection at step 222, modeling module 18 determines whether the selected connection is valid for the network type according to configuration data 16 at step 224. This step may involve checking whether the selected connection is associated with the network type or whether some other rule associated with the network type has been violated (for example, whether an additional connection would exceed the maximum number of connection for that network type). If the selected connection is not valid for the network type, modeling module 18 informs the user that the selected connection is invalid for the network type at step 226, and the method returns to step 210. If the selected connection is valid for the network type, modeling module 18 allows the user to place the selected connection between two components using input device 22 at step 228. At step 230, modeling module 18 determines whether the connection can validly connect the two components according to configuration data 16. The selected connection may not validly connect the two components if the connection cannot be coupled to one of the two components or if the connection violates another rule associated with the network type, such exceeding the maximum number of connections between the two components. If the connection cannot validly connect the two components, modeling module 18 informs the user that the connection cannot validly connect the two components at step 232, and the method continues at step 210. Otherwise, modeling module 18 displays a connection line to represent the connection between the two component using output device 24 at step 234. Modeling module 18 receives and stores attributes for the connection at step 236. Modeling module 18 may receive attributes, such as a name or description from the user, or receive attributes, such as connection properties, from configuration data 16.

At step 238, modeling module 18 may receive a user request to assign a hierarchy of connectors to a connection. If modeling module 18 receives a request to assign connectors at step 238, modeling module 18 determines whether the connectors are valid for a subordinate level of the connection at step 240. The connectors may be invalid if the connection does not include a subordinate level for the connection or if the connectors would exceed the maximum number of connectors for the subordinate level. If the connectors are not valid for the connection, modeling module 18 informs the users that the connectors are not valid for the subordinate level of connection at step 242, and the method returns to step 210. Otherwise, modeling module 18 assigns the connectors to the connection at step 244. Modeling module also receives and stores attributes for the connectors at step 246. Modeling module 18 may receive attributes, such as a name or description from the user, or receive attributes, such as connector properties, from configuration data 16.

At step 248, modeling module 18 may receive a user request to validate the network. If modeling module 18 receives a validation request at step 248, modeling module 18 determines whether the network complies with the rules associated with the network type according to configuration data 16 at step 250. This step helps to ensure that the network complies with any rules that otherwise are not properly considered during construction of the network. For example, modeling module 18 may consider any rules regarding the minimum number of components or connections in the network. If the network does not comply with the rules associated with the network type, modeling module 18 informs the user that the network is invalid at step 252 and returns to step 210, where the user may decide to add additional components or connections to achieve compliance with the rules associated with the network type. In a particular embodiment, modeling module may list any rules that are violated by the network or inform the use how to revise the network to achieve compliance. If the network complies with the rules, modeling module informs the user that the network is valid at step 254.

At step 256, modeling module 18 may receive a user request to provision the network. If modeling module 18 does not receive a user provisioning request at step 256, the method returns to step 210, where the user may continue to design and construct the network. If modeling module 18 does receive a user request to provision the network, modeling module 18 communicates instructions to components of the network designed by the user at step 258. In a particular embodiment, these instruction may cause the components to couple physical ports together using a cross-connect, assign virtual ports to physical ports, or associate two virtual ports with one another. In an alternative embodiment, modeling module 18 may provision selected portions of the network. After provisioning all or part of the network, the method ends.

Figure 6A:
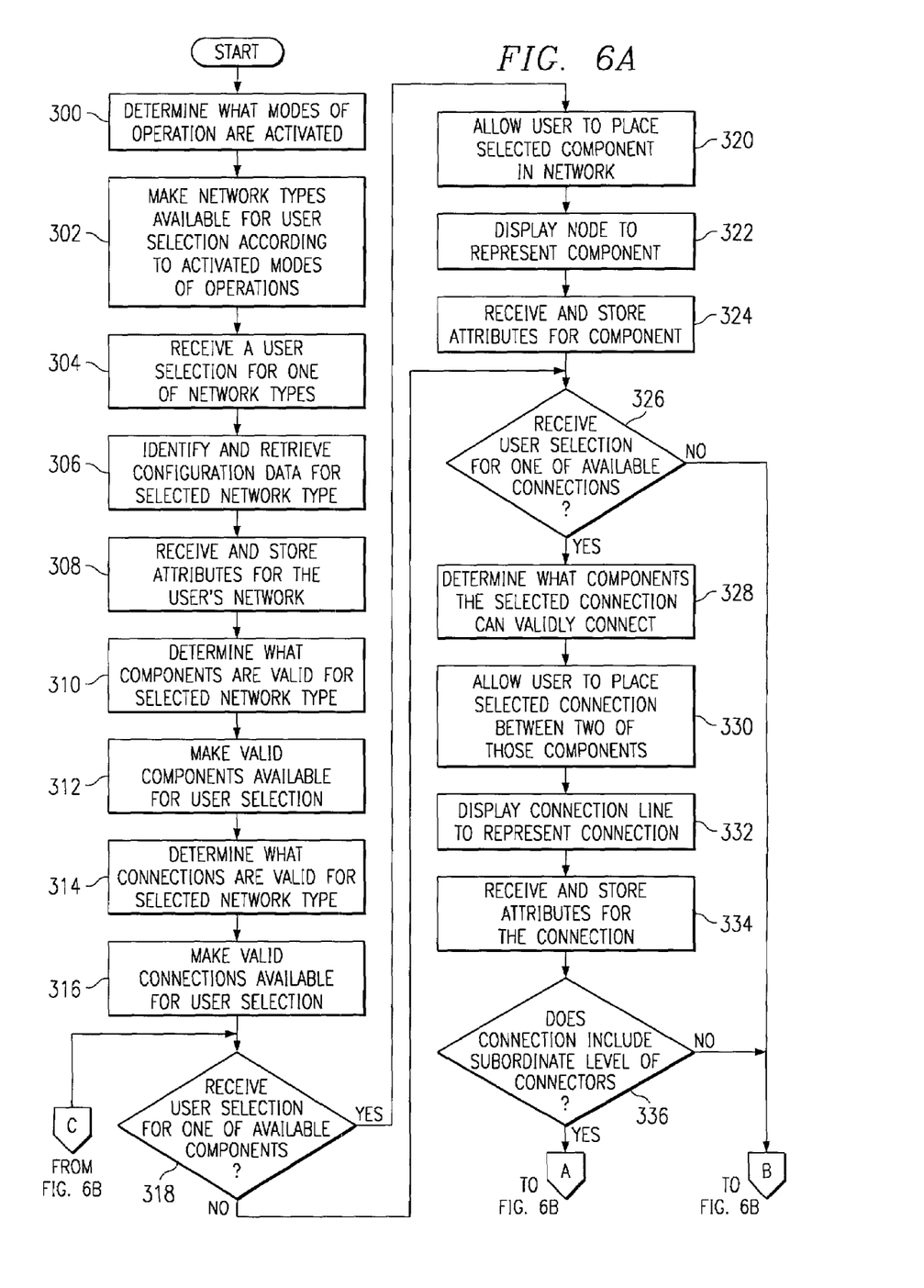
FIGS. 6A–6B are is a flowchart of a method of modeling communication networks using a generic modeling module and configuration data for different types of communication networks, where the modeling module only makes valid components and connections available to a user according to the configuration data.
Figure 6B:
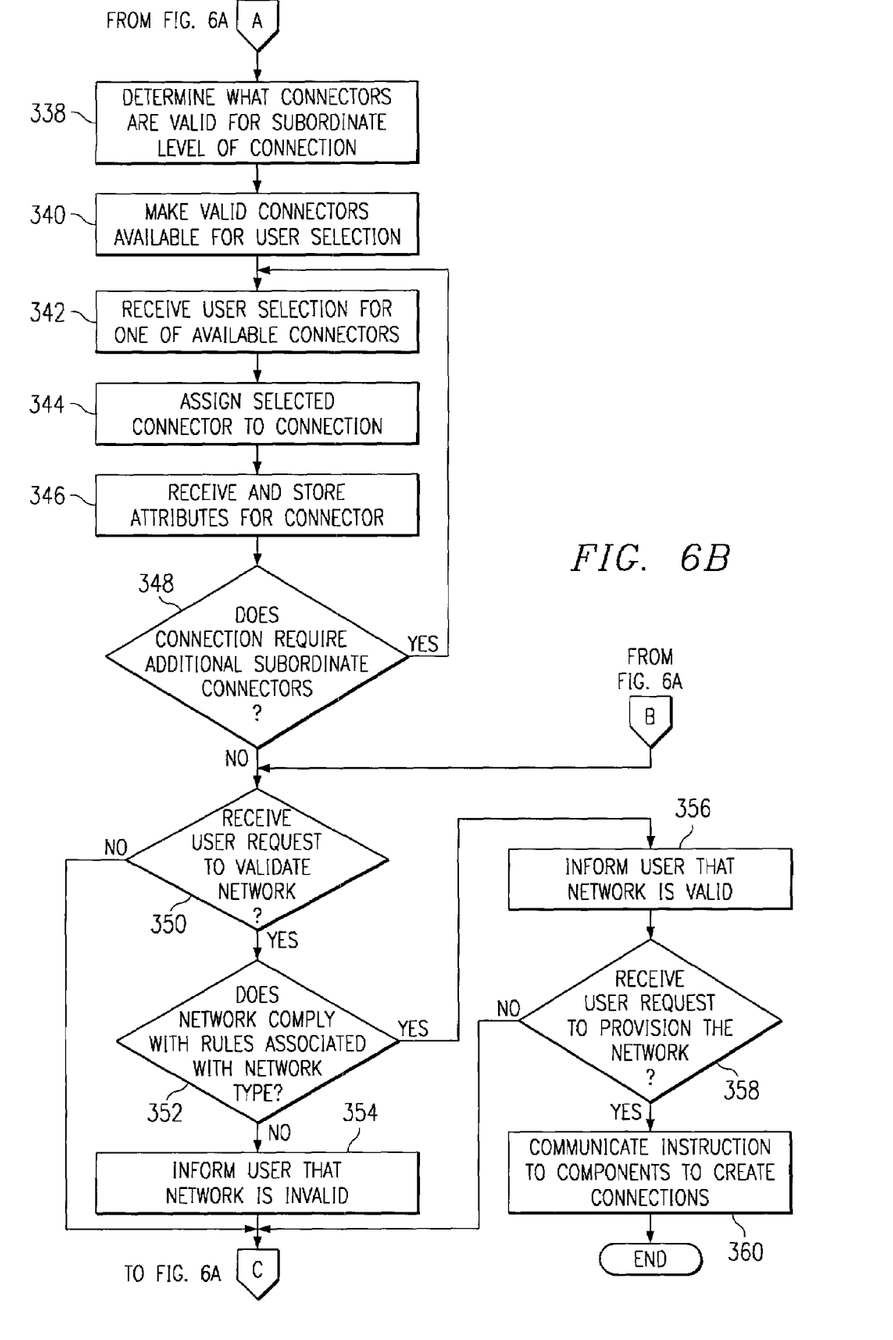

FIGS. 6A–6B are a flowchart of a method of modeling communication networks using modeling module 18 and configuration data 16, where modeling module 18 only makes valid components and connections available to a user according to configuration data 16. The method begins at step 300, where modeling module 18 determine what modes of operation are activated. Modeling module 18 makes network types available for user selection according the activated modes of operations at step 302 and receives a user selection for one of the network types at step 304.

Modeling module 18 identifies and retrieves configuration data 16 for the user's selected network type at step 306. As described above, configuration data 16 describes the components and connections for the selected network type and defines rules for connecting the components using the connections.

Modeling module 18 receives and stores attributes for the user's network at step 308. In a particular embodiment, modeling module 18 receives a name, description, or other attributes from the user or receives network-specific attributes from configuration data 16. In an alternative embodiment, modeling module 18 automatically generates attributes, such as an initial date of creation.

Modeling module 18 makes valid components and connection available to the user for the design and construction of the user's network at steps 310–316. Modeling module 18 determines what components are valid for the user's selected network type at step 310 according to configuration data 16 and makes the valid components available for user selection at step 312. Modeling module 18 determines what connections are valid for the user's selected network type according to configuration data 16 at step 314 and makes the valid connections available for user selection at step 316. Modeling module 18 allows the user to design and construct the network by following steps 318–324 to add available components and steps 326–348 to add available connections.

Modeling module allows the user to add available components to the network according to configuration data 16 at steps 318–324. If modeling module 18 receives a user selection for one of the available components at step 318, modeling module 18 allows the user to place the selected component in the network at step 320 and displays a node to represent the component at step 322. Modeling module 18 receives and stores attributes for the component at step 324. Modeling module 18 may receive attributes, such as a name or description from the user, or receive attributes, such as component properties, from configuration data 16.

Modeling module allows the user to add available connections to the network according to configuration data 16 at steps 326–348. If modeling module 18 receives a user selection for one of the available connections at step 326, modeling module 18 determines what components the selected connection can validly connect at step 328. Modeling module 18 allows the user to place the selected connection between two of those components at step 330 and displays a connection line to represent the connection at step 332. Modeling module receives and stores attributes for the connection at step 334. Modeling module 18 may receive attributes, such as a name or description from the user, or receive attributes, such as connection properties, from configuration data 16.

If the connection includes a subordination level of connectors according to configuration data 16 at step 336, modeling module 18 allows the user to select connectors for the connection at steps 338–348. Modeling module 18 determines what connectors are valid for the subordinate level of the connection according to configuration data 16 at step 338 and makes the valid connectors available for user selection at step 340. Modeling module 18 receives a user selection for one of the available connectors at step 342 and assigns the selected connector to the connection at step 344. Modeling module 18 receives and stores attributes for the connector at step 346. If modeling module 18 determines that the connection requires additional subordinate connectors at step 348, the method returns to step 342, where modeling module 18 receives another users selection for a valid connector.

During design and construction of the user's network or upon completion of the design and construction, modeling module 18 may validate the network at steps 350–356. If modeling module 18 receives a user request to validate the network at step 350, modeling module 18 determines whether the network complies with the rules associated with the network type according to configuration data 16 at step 352. This step helps to ensure that the network complies with any rules that otherwise are not properly considered during construction of the network. For example, modeling module 18 may consider any rules regarding the minimum number of components or connection in the network. If the network does not comply with the rules associated with the network type, modeling module 18 informs the user that the network is invalid at step 354 and returns to step 318, where the user may decide to add additional components or connections to achieve compliance with the rules associated with the network type. In a particular embodiment, modeling module may list any rules that are violated by the network or inform the use how to revise the network to achieve compliance. If the network complies with the rules, modeling module informs the user that the network is valid at step 356.

After validating the network at steps 350–356, modeling module 18 may receive a user request to provision the network at step 358. If modeling module 18 does not receive a provisioning request at step 358, the method returns to step 318, where the user may decide to add additional components or connections to the network. If modeling module 18 does receive a user request to provision the network, modeling module 18 communicates instructions to components of the network designed by the user at step 360. In a particular embodiment, these instruction may cause the components to couple physical ports together using a cross-connect, assign virtual ports to physical ports, or associate two virtual ports with one another. In an alternative embodiment, modeling module 18 may provision selected portions of the network. After provisioning all or part of the network, the method ends.

Although an embodiment of the invention and its advantages are described in detail, a person skilled in the art could make various alterations, additions, and omissions with departing from the spirit and scope of the present invention as defined by the appended claims.

What is claimed is:

1. A system for modeling communication networks, comprising:
   a memory operable to store configuration data for different types of communication networks, the configuration data associating each type of communication network with components, connections, and rules for connecting the components using the connections; and
   a processing module coupled to the memory and operable to model the different types of networks using the configuration data, the processing module further operable to allow a user to select one of the types of communication networks and to design a model network using the components and connections associated with the selected type of communication network according to the configuration data.

2. The system of claim 1, wherein the processing module is further operable to determine whether a mode operation corresponding to a type of communication network is activated and to allow a user to design a model network of that type of communication network if the corresponding mode of operation is activated.

3. The system of claim 1, wherein the processing module is further operable to allow the user to select one of the components associated with the selected type of communication network, to display a node to represent the selected component in the model network, and to associate equipment with the selected component.

4. The system of claim 1, wherein the processing module is further operable to allow the user to select one of the connections associated with the selected type of communication network, to connect two components using the selected connection according to the rules associated with the selected type of communication network, and to display a connection line between two nodes to represent the connection between the two components.

5. The system of claim 1, wherein the rules associated with at least one of the types of communication networks indicate a maximum number of connections between one component and other components.

6. The system of claim 1, wherein:
   the configuration data associates at least one of the types of communication networks with a hierarchy of connectors; and
   the processing module is further operable to allow a user to assign subordinate connectors to a connection according to the configuration data associated with the type of communication network.

7. The system of claim 1, wherein the processing module is further operable to validate the user's model network to ensure compliance with the rules associated with the type of communication network according to the configuration data.

8. The system of claim 1, wherein the processing module is further operable to provision some of the model network by communicating instructions to some components.

9. The system of claim 1, wherein the processing module comprises software instructions for modeling a generic communication network and interfaces with configuration data for specific types of communication networks.

10. The system of claim 1, wherein the configuration data associates the components with component properties and associates the connections with connection properties.

11. A computer-implemented method of modeling communication networks, comprising:
   storing configuration data for different types of communication networks, the configuration data associating each type of communication network with components, connections, and rules for connecting the components using the connections;
   receiving a user selection for one of the different types of communication networks; and
   allowing a user to design a model network using the components and connections associated with the selected type of communication network according to the configuration data.

12. The method of claim 11, further comprising:
   determining whether a mode operation corresponding to a type of communication network is activated; and
   allowing a user to design a model network of that type of communication network if the corresponding mode of operation is activated.

13. The method of claim 11, further comprising:
receiving a user selection for one of the components associated with the selected type of communication network;
displaying a node to represent the selected component in the model network; and
associating equipment with the selected component.

14. The method of claim 11, further comprising:
receiving a user selection for one of the connections associated with the selected type of communication network;
connecting two components using the selected connection according to the rules associated with the type of communication network; and
displaying a connection line between two nodes to represent the connection between the two components.

15. The method of claim 11, wherein the rules associated with at least one of the different types of communication networks indicate a maximum number of connections between one component and other components.

16. The method of claim 11, wherein:
the configuration data associates at least one of the different types of communication network with a hierarchy of connectors; and
allowing the user to design the model network further comprises assigning subordinate connectors to a connection according to the configuration data associated with the type of communication network.

17. The method of claim 11, further comprising validating the model network to ensure compliance with the rules associated with the selected type of communication network according to the configuration data.

18. The method of claim 11, further comprising provisioning some of the model network by communicating instructions to some components.

19. The method of claim 11, wherein allowing the user to design a model network further comprises interfacing software instructions for modeling a generic communication network with configuration data for specific types of communication networks.

20. The method of claim 11, wherein the configuration data associates the components with component properties and associates the connections with connection properties.

21. Network modeling software embodied in a computer-readable medium and operable to perform the following steps:
storing configuration data for different types of communication networks, the configuration data associating each type of communication network with components, connections, and rules for connecting the components using the connections;
receiving a user selection for one of the different types of communication networks; and
allowing a user to design a model network using the components and connections associated with the selected type of communication network according to the configuration data.

22. The network modeling software of claim 21, further operable to perform the steps of:
determining whether a mode operation corresponding to a type of communication network is activated; and
allowing a user to design a model network of that type of communication network if the corresponding mode of operation is activated.

23. The network modeling software of claim 21, further operable to perform the steps of:
receiving a user selection for one of the components associated with the selected type of communication network;
displaying a node to represent the selected component in the model network; and
associating equipment with the selected component.

24. The network modeling software of claim 21, further operable to perform the steps of:
receiving a user selection for one of the connections associated with the selected type of communication network;
connecting two components using the selected connection according to the rules associated with the type of communication network; and
displaying a connection line between two nodes to represent the connection between the two components.

25. The network modeling software of claim 21, wherein the rules associated with at least one of the different types of communication networks indicate a maximum number of connections between one component and other components.

26. The network modeling software of claim 21, wherein:
the configuration data associates at least one of the different types of communication network with a hierarchy of connectors; and
allowing the user to design the model network further comprises assigning subordinate connectors to a connection according to the configuration data associated with the type of communication network.

27. The network modeling software of claim 21, further operable to perform the step of validating the on model network to ensure compliance with the rules associated with the selected type of communication network according to the configuration data.

28. The network modeling software of claim 21, further operable to perform the step of provisioning some of the model network by communicating instructions to some components.

29. The network modeling software of claim 21, wherein allowing the user to design a model network further comprises interfacing software instructions for modeling a generic communication network with configuration data for specific types of communication networks.

30. The network modeling software of claim 21, wherein the configuration data associates the components with component properties and associates the connections with connection properties.

31. A system for modeling communication networks, comprising:
a memory operable to store first configuration data for a first type of communication network and second configuration data for a second type of communication network; and
a processing module coupled to the memory and operable to determine whether a first mode operation corresponding to the first type of communication network is activated and to allow a user to design a model network of the first type of communication network using the first configuration data if the first mode of operation is activated, the processing module further operable to determine whether a second mode of operation corresponding to the second type of communication network is activated and to allow a user to design a model network of the second type of communication network using the second configuration data if the second mode of operation is activated.

32. The system of claim 31, wherein:
- the first configuration data describes components and connections that may be included in the model network of the first type of communication network and rules for connecting the components using the connections; and
- the processing module allows a user to design the model network of the first type of communication network using the components and connections according to the rules.

33. The system of claim 31, wherein the processing module allows the user to design the model network of the first type of communication network by creating nodes to represent components of the first type of communication network and creating connection lines to represent connections between the components according to the first configuration data.

34. A computer-implemented method for modeling communication networks, comprising:
- storing first configuration data for a first type of communication network;
- storing second configuration data for a second type of communication network;
- determining whether a first mode operation corresponding to the first type of communication network is activated;
- allowing a user to design a model network of the first type of communication network using the first configuration data if the first mode of operation is activated;
- determine whether a second mode of operation corresponding to the second type of communication network is activated; and
- allowing a user to design a model network of the second type of communication network using the second configuration data if the second mode of operation is activated.

35. The method of claim 34, wherein:
- the first configuration data describes components and connections that may be included the model network of the first type of communication network and rules for connecting the components using the connections; and
- allowing the user to design the model network of the first type further comprises using the components and connections according to the rules.

36. The method of claim 34, wherein allowing the user to design the model network of the first type of communication network further comprises displaying nodes to represent components of the first type of communication network and connection lines to represent connections between the components according to the first configuration data.

* * * * *